Patented June 14, 1949

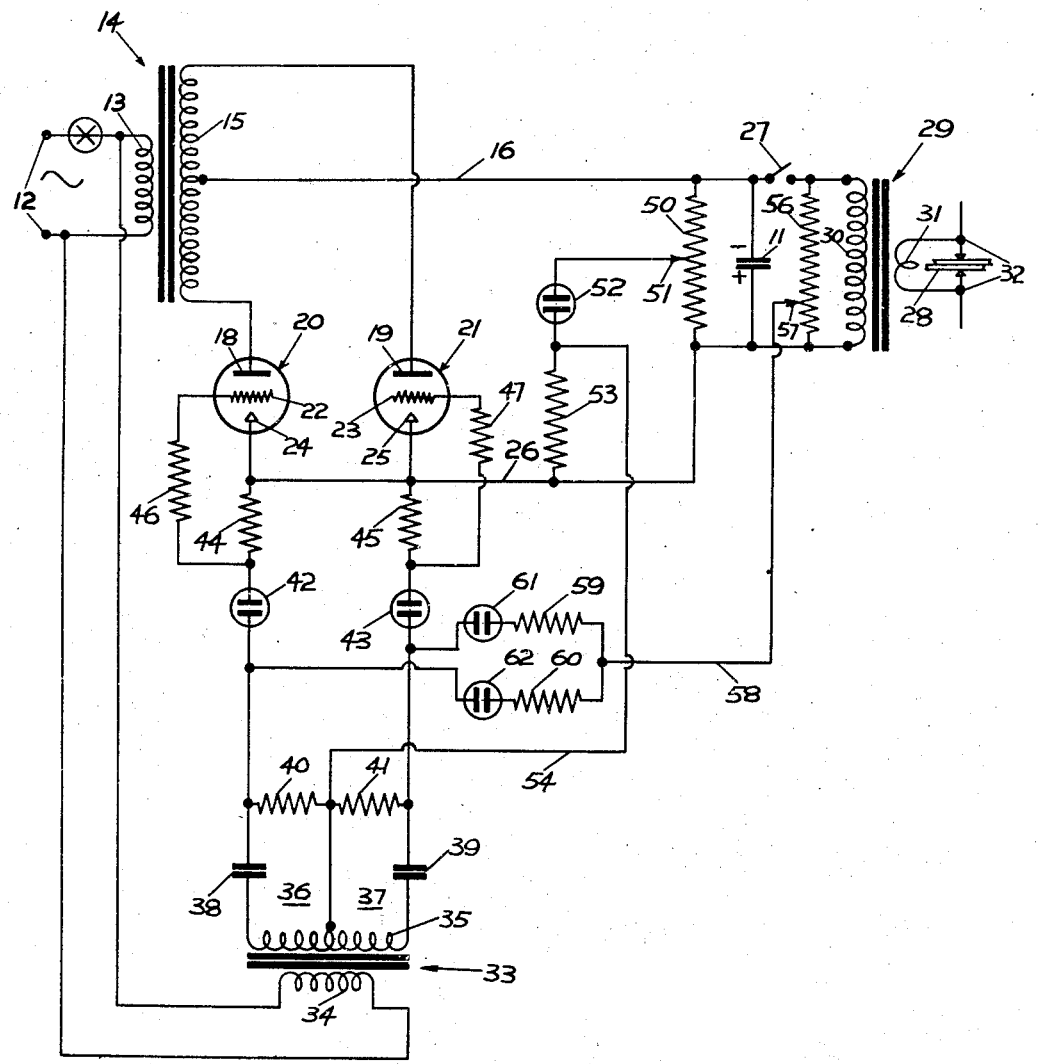

2,472,838

UNITED STATES PATENT OFFICE 2,472,838

SYSTEM FOR CHARGING AND DISCHARGING ENERGY STORAGE DEVICES

Hans Klemperer, Belmont, Mass., assignor to Raytheon Manufacturing Company, Newton, Mass., a corporation of Delaware Application March 26, 1947, Serial No. 737,327

4 Claims. (Cl. 320—1)

This invention relates to an electrical system for controlling the charging and discharging of an electrical energy storage device such, for example, as a condenser. In certain electrical systems, for example, in condenser welding systems, it is desirable to control the rate at which the condenser or other storage device is charged or energized, and to prevent the flow of energy thereto during the period in which the condenser is being discharged through the load circuit.

In my copending application, Ser. No. 722,353, filed January 16, 1947, there is shown a condenser welding system in which, upon the closure of the switch controlling the discharge of the condenser into the load circuit, the condenser is electrically isolated from the charging means.

It is among the objects of the present invention to provide a simplified circuit of the type described, and which will automatically effect the electrical isolation of the condenser or other storage device from the source upon the closure of the switch or equivalent circuit closing means controlling the discharge of the condenser through the load circuit, without interfering with the means for controlling the rate of charging or the potential to which the condenser is charged.

The foregoing and other objects of the invention will be made fully apparent to those skilled in the art from a consideration of the following detailed description taken in conjunction with the accompanying drawing wherein the single figure is a schematic diagram of a condenser welding system embodying the present invention.

In the embodiment of the invention shown, an energy storage device, in this instance a capacitor 11, is adapted to be charged from a source of alternating current connected across the terminals 12 of the primary winding 13 of a transformer 14 having a secondary winding 15. The secondary winding is provided with a center tap connected by a conductor 16 to one side of the capacitor 11. The end terminals of the secondary winding 15 are connected to the anodes 18 and 19 of a pair of gaseous discharge tubes 20 and 21, which tubes may be of the type known in the art as thyratrons having thermionic cathodes 24 and 25 respectively. The cathodes 24 and 25 are jointly connected by conductor 26 to the opposite side of the capacitor 11.

The capacitor 11 is adapted to be discharged through a load circuit via a switch 27. In the instance shown, the load is a resistance welding load, and the load circuit includes a welding transformer 29 having a primary winding 30 and a secondary loop 31. Each terminal of the secondary loop 31 is connected to one of a pair of welding electrodes 32, which electrodes are adapted to engage the work 28. One terminal of the primary winding 30 of the transformer 29 is connected through the switch 27 to one side of the capacitor 11 and the other terminal of said primary winding is connected to the opposite side of said capacitor.

In order to supply control voltages to the cathode-grid circuits of the tubes 20 and 21, voltages of the same frequency as the source, and shifted in phase relative thereto, are derived in the following manner. A transformer 33 is provided having a primary winding 34, the terminals of which are connected across the terminals 12 of the source, and also having a secondary winding 35 divided by a center tap providing a connection for a conductor 54. A pair of phase-shifting circuits 36 and 37 are provided by a pair of condensers 38 and 39, each connected on one side thereof to one of the outer terminals to the secondary winding 35 and resistors 40 and 41 connected between the opposite sides of said condensers and the conductor 54 leading to the center tap of the secondary winding 35. The junction between the condenser 38 and resistor 40 of the phase-shifting network 36 is connected to the cathode-grid circuit of the tube 20 by way of a glow discharge tube 42, and a similar connection is made between the phase-shifting network 37 and the cathode-grid circuit of the tube 21 by way of a glow discharge tube 43. The cathode-grid circuit of the tube 20 comprises a resistor 44 connected between the cathode 24 and glow tube 42 and a grid resistor 46 connected between the grid 22 and the junction between the resistor 44 and the glow tube 42. Similar connections are provided for the cathode-grid circuit of the tube 21 by means of resistors 45 and 47. The phase-shifting networks just described provide a means for controlling the rate of charging of the capacitor 11 to the end that the demand upon the terminals 12 of the source will be more evenly distributed over the charging period in a manner described in my copending application, Ser. No. 609,058, filed August 6, 1945, now Patent No. 2,464,238, dated March 15, 1949. The phase-shifted voltage of the circuits 36 and 37, in the present instance, leads the voltage applied by the source and this voltage is applied inversely to the grids 22 and 23 to the end that these grids will be biased negatively during the early portion of a positive half-wave of potential across the cathode-anode circuit of either tube.

In order to cut off the supply of charging current to the capacitor 11 when the charge thereon reaches a predetermined value, a resistor 50 is connected across the capacitor 11 and a contact 51 adjustable on said resistor 50 is connected by way of a glow tube 52 and resistor 53 to the conductor 26. The conductor 54 is connected to the junction between the glow tube 52 and resistor 53. By the construction just described, when the charge on the condenser 11 reaches a predetermined value the glow tube 52 fires and the potential across the resistor 53 is applied to the cathode-grid circuits of the tubes 20 and 21 through the conductor 54 and resistors 40 and 41 to supply a continuous blocking potential to the grids 22 and 23.

It will be apparent that the construction just described would no longer be effective to block conduction through the tubes 20 and 21 after the closure of the switch 27 and the partial discharge of the condenser 11 into the load circuit. In order to apply a negative blocking potential to grids 22 and 23 after the closure of the switch 27, the invention provides a resistor 56 connected at one end to the junction between the switch 27 and the primary winding 30 and having its opposite end connected to the opposite end of the winding 30 by way of conductor 26. A contact 57, adjustable on resistor 56, is connected by way of a conductor 58, resistor 59, and glow tube 61 to the junction between the phase-shifting network 37 and the glow tube 43. A resistor 60 and glow tube 62 are connected between the conductor 58 and the junction between the phase-shifting network 36 and the glow tube 42.

By the construction just described, upon the closure of the switch 27, the potential drop across that portion of the resistor 56 between the movable contact 57 and the conductor 26 is applied between the grids and cathodes of the tubes 20 and 21, effectively blocking these tubes until the complete discharge of the condenser 11 or until the opening of the switch 27. The glow discharge tubes 61 and 62 and resistors 59 and 60 prevent the shunting of the phase-shifted potentials imposed by the phase-shifting networks 36 and 37.

From the foregoing it will be apparent that the invention provides a circuit in which the supply of current to the condenser is effectively blocked during the discharge period of the condenser. This end is achieved in a simple manner without the provision of additional switches or condensers and by applying a potential derived directly from the capacitor 11 during the discharge thereof. Other embodiments of the invention within the scope of the appended claims will be apparent to those skilled in the art from a consideration of the embodiment shown and the teachings hereof.

What is claimed is:

1. In combination, a load circuit, an energy storage device, a source of alternating current, a charging circuit connecting said storage device to said source, a discharge tube including a control electrode in said charging circuit for controlling the flow of current to said storage device, a source of control potential for controlling the charging of said energy storage device, a discharge circuit for discharging said storage device into said load circuit, switching means controlling the discharge of said storage device into said load circuit, a shunt circuit connected across said load circuit for by-passing a portion of the energy from said storage device upon closure of said switching means, and circuit means for deriving a control potential from said shunt circuit for applying a blocking potential to said control electrode to electrically isolate said storage device from said source when said switching means is closed, and a glow-discharge device in said circuit means for preventing the shunting of said control potential through said circuit means.

2. In combination, a load circuit, an energy storage device, a source of alternating current, a charging circuit connecting said storage device to said source, a discharge tube having a control grid in said charging circuit for controlling the flow of current to said storage device, means for applying a phase-shifted voltage from said source to said grid to control the charging of said storage device, a discharge circuit for discharging said storage device into said load circuit, switching means controlling the discharge of said storage device into said load circuit, a shunt circuit connected across said load circuit for by-passing a portion of the energy from said storage device upon closure of said switching means, means for deriving a control potential from said shunt circuit, and circuit means including a glow discharge device for superimposing said derived potential upon said phase-shifted voltage for applying a blocking potential to said control electrode to electrically isolate said storage device from said source when said switching means is closed.

3. In combination, a load circuit, an energy storage device, a source of alternating current, a charging circuit connecting said storage device to said source, a discharge tube including a control electrode in said charging circuit for controlling the flow of current to said storage device, a phase-shifting circuit for applying a phase-shifted voltage from said source to said control electrode to control the rate of charging of said storage device, a discharge circuit for discharging said storage device into said load circuit, circuit closing means controlling the discharge of said storage device into said load circuit, a voltage-divider connected across said load circuit on the load side of said circuit closing means for deriving a control potential from said energy storage device, and a circuit for applying said derived potential to said control electrode to electrically isolate said storage device from said source when said switching means is closed, said last mentioned circuit including a glow-discharge tube and a resistor connected in series between said voltage divider and said control electrode.

4. A welding circuit comprising a capacitor, a source of alternating current, circuit means for charging said capacitor from said source, a grid-controlled gaseous discharge device in said circuit between said source and said capacitor for rectifying said current, a welding-load circuit including a switching means for discharging said capacitor, means for applying a phase-shifted voltage from said source to said grid to control the charging of said capacitor, a resistor connected in parallel with said welding load circuit, circuit means effective upon closure of said switch for superimposing a portion of the voltage drop across said resistor upon said phase-shifted voltage to block said gaseous discharge device during the discharge of said condenser, and means in said circuit means for preventing the shunting of said phase-shifted voltage through said circuit means.

HANS KLEMPERER.

REFERENCES CITED

The following references are of record in the file of this patent:

UNITED STATES PATENTS

| Number | Name | Date |
| --- | --- | --- |
| 2,404,971 | Mahoney et al. | July 30, 1946 |